US012643326B2

(12) United States Patent
Yoshino et al.

(10) Patent No.: US 12,643,326 B2
(45) Date of Patent: Jun. 2, 2026

(54) INK JET RECORDING METHOD AND INK JET RECORDING APPARATUS

(71) Applicant: CANON KABUSHIKI KAISHA, Tokyo (JP)

(72) Inventors: Eriko Yoshino, Kanagawa (JP); Soichi Nagai, Kanagawa (JP); Atsuhito Yoshizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 18/796,763

(22) Filed: Aug. 7, 2024

(65) Prior Publication Data

US 2025/0050643 A1     Feb. 13, 2025

(30) Foreign Application Priority Data

Jul. 29, 2024     (JP) ................................. 2024-122048

(51) Int. Cl.
$$\begin{array}{lll} \textbf{\textit{B41J 2/165}} & & (2006.01) \\ \textbf{\textit{B41J 2/175}} & & (2006.01) \end{array}$$
(Continued)

(52) U.S. Cl.
CPC ....... *B41J 2/16535* (2013.01); *B41J 2/16508* (2013.01); *B41J 2/16517* (2013.01); *B41J 2/16538* (2013.01); *B41J 2/16552* (2013.01); *B41J 2/17536* (2013.01); *B41J 2/17553* (2013.01); *C09D 11/037* (2013.01); *C09D 11/324* (2013.01); *B41J 2002/1655* (2013.01); *B41J 2002/16558* (2013.01); *B41J 2002/16573* (2013.01); *B41P 2235/21* (2013.01)

(58) Field of Classification Search
CPC ................ B41J 2/16535; B41J 2/16508; B41J 2/16517; B41J 2/16538; B41J 2/16552; B41J 2/17536; B41J 2/17553; B41J 2002/1655; B41J 2002/16558; B41J 2002/16573; C09D 11/037; C09D 11/324; B41P 2235/21
See application file for complete search history.

(56) References Cited

U.S. PATENT DOCUMENTS

| | | | |
|---|---|---|---|
| 7,814,918 B2 | 10/2010 | Nagai et al. | |
| 8,408,691 B2 | 4/2013 | Koike et al. | |
| (Continued) | | | |

FOREIGN PATENT DOCUMENTS

| | | | |
|---|---|---|---|
| JP | 2006-205715 A | 8/2006 | |

*Primary Examiner* — Henok D Legesse
(74) *Attorney, Agent, or Firm* — Venable LLP

(57) ABSTRACT

Provided is an ink jet recording method with which, even when a recording head in which a protective tape is bonded to an ejection orifice surface which is a water-repellent surface is used, occurrence of ejection misdirection of an ink is suppressed, and the ejection misdirection hardly occurs even after long-period use. The ink jet recording method includes recording an image through use of an ink jet recording apparatus including a wiping unit for an ejection orifice surface subjected to water-repellent treatment. A protective tape to be peeled at the time of use is bonded to the ejection orifice surface. The method includes a first cleaning sequence of wiping the ejection orifice surface through use of one wiper having a blade shape, the first cleaning sequence including a first wiping step and a second wiping step.

19 Claims, 4 Drawing Sheets

(51) Int. Cl.
      *C09D 11/037*      (2014.01)
      *C09D 11/324*      (2014.01)

(56) References Cited

U.S. PATENT DOCUMENTS

| | | | |
|---|---|---|---|
| 8,491,715 | B2 | 7/2013 | Gouda et al. |
| 8,987,348 | B2 | 3/2015 | Mukae et al. |
| 9,120,317 | B2 * | 9/2015 | Ito ........................ B41J 2/16538 |
| 9,789,698 | B2 | 10/2017 | Nagai et al. |
| 12,005,726 | B2 | 6/2024 | Nakata et al. |
| 2008/0283092 | A1 | 11/2008 | Nagai et al. |
| 2014/0253634 | A1 * | 9/2014 | Kobayashi ......... B41J 11/00214 |
| | | | 347/33 |
| 2016/0185121 | A1 * | 6/2016 | Somete ................ B41J 2/16535 |
| | | | 347/33 |
| 2022/0242155 | A1 | 8/2022 | Tajima et al. |
| 2023/0158809 | A1 | 5/2023 | Yoshida et al. |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

According to an ink jet recording method, images can be recorded on various recording media. In recent years, an ink jet recording apparatus mounted with an ink cartridge having such a configuration that a recording head is incorporated into an ink storage portion storing an aqueous ink has become widespread for the purposes of: simplifying and downsizing an apparatus configuration; and shortening preparation by the time of recording at the time of initial use. This ink cartridge is transported and stored under a state in which the aqueous ink is loaded up to an opening distal end of an ejection orifice, and hence the ink is liable to evaporate. In order to suppress such evaporation of the ink, normally, the ink cartridge is stored with a recording head incorporated therein under a state in which a protective tape including an adhesion layer formed from an adhesive is bonded to an ejection orifice surface to close the ejection orifice.

In addition, in a business field, the ink jet recording method has been utilized at the time of the recording of a full-color document including a chart or the like on a recording medium such as plain paper. In such applications, a need for an ink containing a resin has been growing more and more because the ink hardly causes a decrease in image quality due to ejection misdirection and can record an image excellent in water resistance and scratch resistance.

The ink jet recording method is a method of recording an image by directly applying an ink which is a liquid to a recording medium by ejecting the ink from a minute ejection orifice of a recording head. Accordingly, at the time of recording an image, a fine ink droplet other than the ink related to the recording may float in the atmosphere. The fine ink droplet such as mist not related to the recording may adhere to a portion around the ejection orifice in a surface (ejection orifice surface) of the recording head in which the ejection orifice is formed. When the fine ink droplet adheres to the ejection orifice surface, there occurs so-called "ejection misdirection" in which the straightness of the ink is hindered and thus the ejection is misdirected. Thus, the ejection accuracy of the ink is decreased, and the quality of the image to be recorded is liable to be decreased. Moreover, recording for a long period is liable to cause an increase in an adhesion amount of the ink droplet to the ejection orifice surface, and hence the quality of the image is further decreased along with a recording time.

In order to suppress the occurrence of the ejection misdirection, for example, there has been proposed an ink jet recording apparatus including a cleaning device for wiping the ejection orifice with a body portion of a first wiper that is largely bent, and then wiping the ejection orifice with an edge part of a second wiper (Japanese Patent Application Laid-Open No. 2006-205715).

The inventors of the present invention have verified the ink jet recording apparatus including the cleaning device as proposed in Japanese Patent Application Laid-Open No. 2006-205715. Specifically, an ink cartridge into which a recording head was incorporated was prepared. In the recording head, the ejection orifice surface was formed as a water-repellent surface subjected to water-repellent treatment, and a protective tape to be peeled at the time of start of recording was bonded to the ejection orifice surface (water-repellent surface). An aqueous ink containing a pigment and a resin was stored in an ink storage portion of the ink cartridge. Then, after the ink cartridge was set to the ink jet recording apparatus with the protective tape of the recording head being peeled, an image was recorded. As a result, it was found that the ejection misdirection was liable to occur immediately after the peeling of the protective tape (immediately after the unsealing). Meanwhile, when an aqueous ink containing a self-dispersible pigment but not containing a resin was used, no ejection misdirection immediately after the unsealing was observed. Further, an ink jet recording apparatus including a recording head in which the ejection orifice surface was closed by a cap without bonding a protective tape to the ejection orifice surface (water-repellent surface) was prepared. When an image was recorded through use of an aqueous ink containing a pigment and a resin, no ejection misdirection immediately after uncapping was observed.

SUMMARY OF THE INVENTION

Thus, the present invention has an object to solve problems caused when a recording apparatus including: a recording head in which a protective tape has been bonded to an ejection orifice surface which is a water-repellent surface; and a wiping unit for the ejection orifice surface is used and an aqueous ink containing a pigment and a resin is used. That is, the present invention has an object to provide an ink jet recording method with which, even in such a case, occurrence of ejection misdirection of an ink immediately after peeling of the protective tape (immediately after unsealing) is suppressed, and the ejection misdirection hardly occurs even after long-period use. Further, the present invention has another object to provide an ink jet recording apparatus to be used in this ink jet recording method.

That is, according to the present invention, there is provided an ink jet recording method using an ink jet recording apparatus, the ink jet recording apparatus including: an aqueous ink containing a pigment and a resin; an ink storage portion configured to store the aqueous ink; a recording head including an ejection orifice surface having formed therein an ejection orifice configured to eject the aqueous ink supplied from the ink storage portion, the recording head being incorporated into the ink storage portion; and a wiping unit configured to wipe the ejection orifice surface, the ejection orifice surface being subjected to water-repellent treatment, the ink jet recording method including recording an image by applying the aqueous ink ejected from the ejection orifice to a recording medium. The ejection orifice surface of the recording head has a protective tape bonded thereto, the protective tape including an adhesion layer formed from an adhesive, the protective tape being peeled at the time of use. The ink jet recording method further includes a first cleaning sequence of wiping the ejection orifice surface through use of one wiper having a blade shape, the first cleaning sequence including a first wiping step and a second wiping step that are carried out successively to each other. The first wiping step includes wiping the ejection orifice surface with a body portion of the one wiper with the one wiper being bent. The second wiping step includes wiping the ejection orifice surface with an edge portion of the one wiper.

According to the present invention, it is possible to solve problems caused when the recording apparatus including: the recording head in which the protective tape has been bonded to the ejection orifice surface which is a water-repellent surface; and the wiping unit for the ejection orifice surface is used and the aqueous ink containing the pigment and the resin is used. That is, it is possible to provide the ink jet recording method with which, even in such a case, occurrence of ejection misdirection of the ink immediately after peeling of the protective tape (immediately after unsealing) is suppressed, and the ejection misdirection hardly occurs even after long-period use. Further, according to the present invention, it is possible to provide the ink jet recording apparatus to be used in this ink jet recording method.

Further features of the present invention will become apparent from the following description of exemplary embodiments with reference to the attached drawings.

DESCRIPTION OF THE EMBODIMENTS

Figure 1:
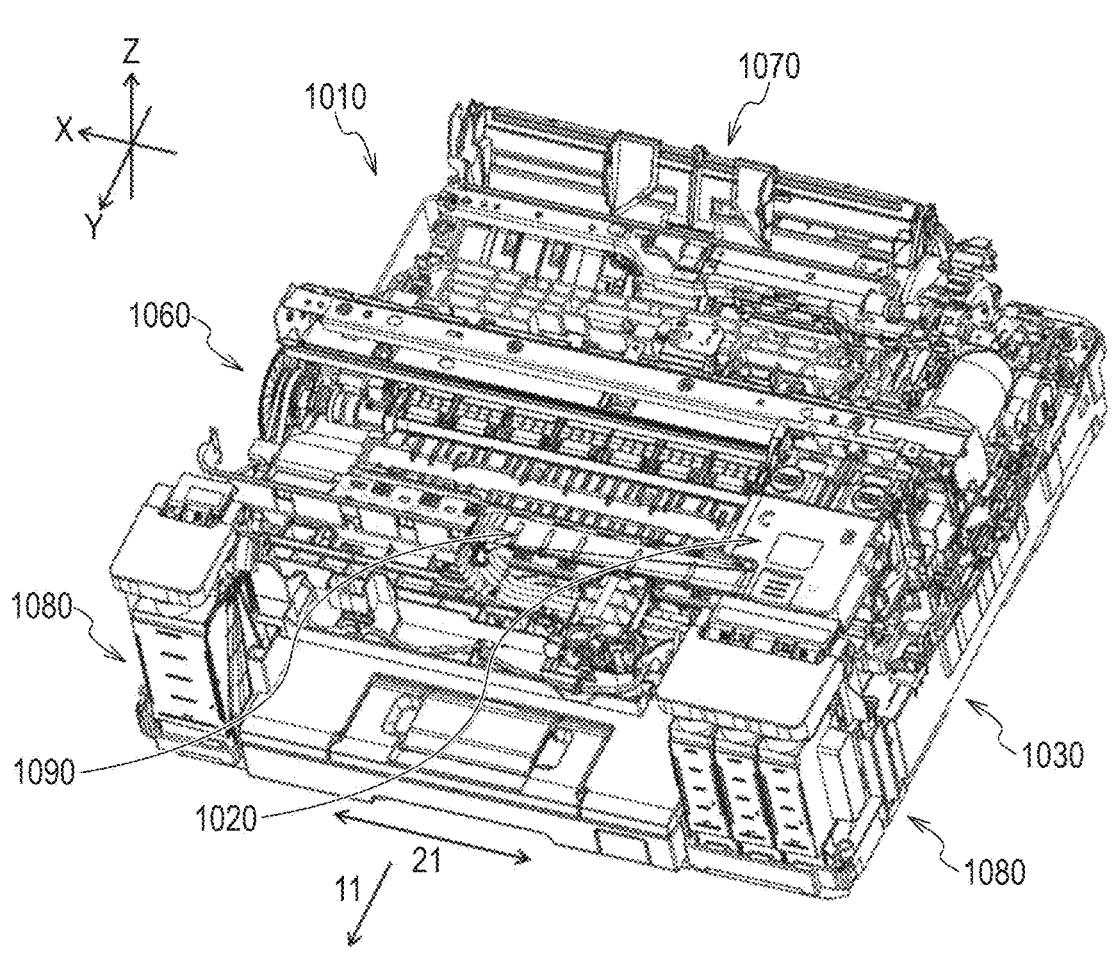
FIG. 1 is a perspective view for schematically illustrating an internal structure of an ink jet recording apparatus according to one embodiment of the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink for ink jet is sometimes simply referred to as "ink". Physical property values are values at normal temperature (25° C.) unless otherwise stated.

The inventors of the present invention have prepared an ink cartridge in which a recording head having an ejection orifice surface having formed therein an ejection orifice that ejects an ink is incorporated into an ink storage portion, the ejection orifice surface being subjected to water-repellent treatment. Then, the inventors have used the prepared ink cartridge and have analyzed ejection misdirection occurring when an ink containing a pigment and a resin is ejected from the recording head immediately after its unsealing by the peeling of its protective tape. The ink cartridge in which the ink storage portion and the recording head are integrally formed is typically stored under a state in which a protective tape including an adhesion layer is bonded to the ejection orifice surface of the recording head to close the ejection orifice for suppressing the evaporation of the ink. Then, at the time of the first use (at the time of the start of the initial use), the ink cartridge packed in a closed container is unsealed and the protective tape is peeled. After that, the cartridge is mounted on a recording apparatus to start image recording. However, the inventors have found that when the protective tape is peeled, part of the adhesive for forming the adhesion layer may remain under the state of adhering to the ejection orifice surface and the ejection misdirection of the ink occurs owing to the remaining adhesive.

However, the inventors have found that when a dye ink or a pigment ink free of any resin is used, no ejection misdirection occurs even under a state in which the adhesive adheres to the ejection orifice surface of the recording head. The inventors have observed the ejection orifice surface of the recording head undergoing the ejection misdirection of the ink from which the bonded protective tape has been peeled. As a result, the adhesion residue of the adhesive was observed. In addition, the inventors have measured the contact angles of the ejection orifice surface with various inks before the bonding of the protective tape, and the contact angles of the ejection orifice surface with the various inks after the bonding and peeling of the protective tape. As a result, the inventors have found that the contact angles thereof with an ink containing a resin before and after the bonding of the protective tape largely differ from each other in a peculiar manner. That is, it is conceivable that the ejection orifice surface in a state in which the adhesive adheres thereto facilitates the wetting of the ink containing the resin to cause its ejection misdirection.

When a recording unit of such a type that an ink storage portion is set in a head cartridge including a recording head is used, the suppression of the evaporation of an ink from an ejection orifice, which is required in an ink cartridge in which the recording head is incorporated into the ink storage portion, is not required. Accordingly, when the recording unit of such a type that the ink storage portion is set in the head cartridge including the recording head is used, the ejection misdirection of the ink resulting from the remaining adhesive does not occur.

The inventors of the present invention have verified a wiping condition of the ejection orifice surface. As a result, the inventors of the present invention have found that, with the configuration described below, the occurrence of the ejection misdirection immediately after peeling of the protective tape is suppressed, and the ejection misdirection hardly occurs even after long-period use. Thus, the present invention has been made. That is, an ink jet recording method of the present invention uses an ink jet recording apparatus including: an ink containing a pigment and a resin; an ink storage portion for storing the ink; a recording head incorporated into the ink storage portion; and a wiping unit for performing wiping. The recording head is to be bonded to the ink storage portion, and includes an ejection orifice surface in which an ejection orifice for ejecting the ink is formed. This ejection orifice surface is subjected to water-repellent treatment. The wiping unit is a unit for wiping the ejection orifice surface of the recording head. A protective tape including an adhesion layer formed from an adhesive is bonded to the ejection orifice surface of the recording head in order to suppress evaporation of the ink from the ejection orifice. This protective tape is peeled at the time of the first use of the ink jet recording apparatus or the recording head. In addition, the ink jet recording method of the present invention includes a first cleaning sequence of wiping the ejection orifice surface through use of one wiper having a blade shape, the first cleaning sequence including a first wiping step and a second wiping step that are carried out successively to each other. The first wiping step is a step of wiping the ejection orifice surface with a body portion of the wiper with the wiper being bent, and the second wiping step is a step of wiping the ejection orifice surface with an edge portion of the wiper.

In the first wiping step, the wiper is relatively largely bent, and the body portion of the wiper is brought into sliding contact with the ejection orifice surface. In this manner, an ink droplet on the ejection orifice surface can be spread, and thus the ink can be blended into the adhering adhesive. In the subsequent second wiping step, the wiper is not bent so large or is almost not bent, and wiping is performed under a state in which the edge portion (part other than the body portion) of the wiper is brought into abutment against the ejection orifice surface. In this manner, a mixture of the adhesive and the ink droplet blended in the first wiping step can be scraped off. On the ejection orifice surface, a large amount of pigment is also adhering. A pigment which is a hard particulate matter is dragged by the wiper to act as a so-called "abrasive" that shaves off the strongly adhering adhesive that cannot be scraped off only by the edge portion of the wiper. As described above, the ink droplet is spread and blended into the adhesive in the first wiping step of performing wiping with the body portion of the wiper, and then the adhesive can be efficiently shaved off in the second wiping step of performing wiping with the edge of the wiper. As a result, it is considered that the occurrence of the ejection misdirection immediately after the unsealing is suppressed, and the ejection misdirection hardly occurs even after long-period use.

When the first wiping step is only carried out without carrying out the second wiping step, the adhesive cannot be scraped off to be removed, and hence the occurrence of the ejection misdirection cannot be suppressed. Further, when the second wiping step is only carried out without carrying out the first wiping step, the ink droplet and the adhesive are not blended. As a result, the adhesive cannot be efficiently removed, and thus the occurrence of the ejection misdirection cannot be suppressed.

<Ink Jet Recording Method and Ink Jet Recording Apparatus>

The ink jet recording method of the present invention is a recording method using an ink jet recording apparatus including: an ink; an ink storage portion configured to store the ink; a recording head; and a wiping unit configured to wipe the ejection orifice surface of the recording head. The ink contains a pigment and a resin. The recording head is a recording head incorporated into the ink storage portion, the recording head having an ejection orifice surface in which an ejection orifice for ejecting the ink supplied from the ink storage portion is formed. The ejection orifice surface is subjected to water-repellent treatment. The ink jet recording method of the present invention includes recording an image by applying the ink ejected from the ejection orifice of the recording head to a recording medium. The ejection orifice surface of the recording head has a protective tape bonded thereon, the protective tape including an adhesion layer formed from the adhesive, the protective tape being peeled at the time of use. Further, the ink jet recording method of the present invention includes a first cleaning sequence of wiping the ejection orifice surface through use of one wiper having a blade shape, the first cleaning sequence including a first wiping step and a second wiping step that are carried out successively to each other. The first wiping step is a step of wiping the ejection orifice surface with a body portion of the wiper with the wiper being bent. In addition, the second wiping step is a step of wiping the ejection orifice surface with an edge portion of the wiper.

In addition, an ink jet recording apparatus of the present invention includes: an ink; an ink storage portion configured to store the ink; a recording head; and a wiping unit configured to wipe the ejection orifice surface. The ink contains a pigment and a resin. The recording head is a recording head incorporated into the ink storage portion, the recording head having an ejection orifice surface in which an ejection orifice for ejecting the ink supplied from the ink storage portion is formed. The ejection orifice surface is subjected to water-repellent treatment. An ink jet recording method to be implemented using this ink jet recording apparatus includes recording an image by applying the ink ejected from the ejection orifice of the recording head to a recording medium. The ejection orifice surface of the recording head has a protective tape bonded thereon, the protective tape including an adhesion layer formed from the adhesive, the protective tape being peeled at the time of use. Further, the ink jet recording method includes a first cleaning sequence of wiping the ejection orifice surface through use of one wiper having a blade shape, the first cleaning sequence including a first wiping step and a second wiping step that are carried out successively to each other. The first wiping step is a step of wiping the ejection orifice surface with a body portion of the wiper with the wiper being bent. In addition, the second wiping step is a step of wiping the ejection orifice surface with an edge portion of the wiper.

(Ink Jet Recording Apparatus)

FIG. 1 is a perspective view for schematically illustrating an internal structure of an ink jet recording apparatus according to one embodiment of the present invention. As illustrated in FIG. 1, an ink jet recording apparatus 1010 of this embodiment includes a carriage 1020, a conveyance unit 1060 and a maintenance unit 1030. A recording head for ejecting an ink and an ink cartridge (not shown) are mounted on the carriage 1020. The conveyance unit 1060 is a unit for conveying a recording medium fed from a sheet feeding unit 1070. The maintenance unit 1030 is a unit for maintaining the recording head mounted on the carriage. The ink jet recording apparatus 1010 further includes a tube 1090 for supplying the ink to the recording head, and a main tank 1080 for storing the ink. The conveyance unit 1060 is arranged on one end side in a main scanning direction 21 of the carriage having the recording head mounted thereon, and the maintenance unit 1030 is arranged on another end side in the main scanning direction 21. Drive from a drive source (not shown) of the conveyance unit 1060 is transmitted by a drive train to the maintenance unit 1030.

The recording medium fed one by one from the sheet feeding unit 1070 is conveyed in a discharge direction 11 of the recording medium by the conveyance unit 1060. An ink is ejected from the recording head while performing a reciprocating operation of the carriage 1020 having the recording head mounted thereon in a direction substantially orthogonal to the discharge direction 11 of the recording medium (main scanning direction 21), and thus recording is performed on the recording medium. At the time of performing the recording, the carriage 1020 starts the recording from the maintenance unit 1030 side and moves to the conveyance unit 1060 side, and comes back to return to the maintenance unit 1030 side. At the position of the maintenance unit 1030, preliminary ejection is performed from the recording head into a cap 1031 in the maintenance unit. This reciprocating operation is assumed as as one scanning of the carriage 1020, and is repeated a plurality of times with respect to the recording medium so that an image is recorded across the entire surface of the recording medium.

Figure 2:
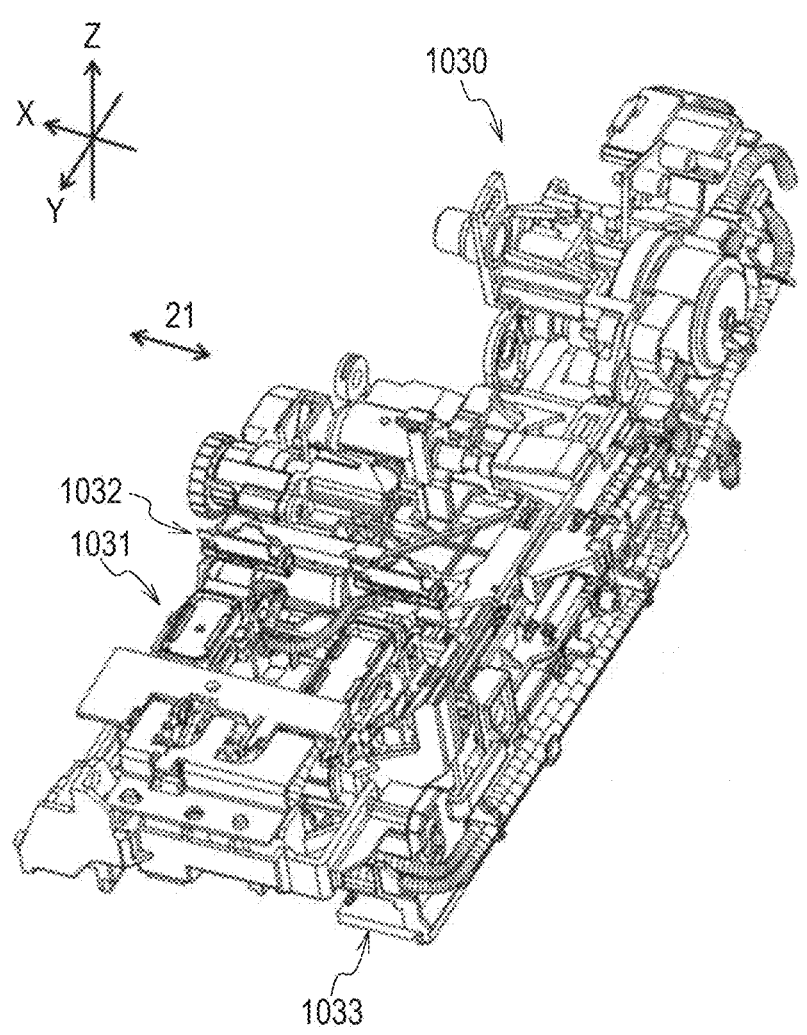
FIG. 2 is a perspective view for schematically illustrating an example of a maintenance unit.

FIG. 2 is a perspective view for schematically illustrating an example of the maintenance unit. The ink jet recording apparatus has a recording head for black and a recording head for three colors mounted thereon. The cap 1031 and a wiper 1032 are provided for each of the recording heads. A cam slider 1033 is actuated so that a cam surface of the cam slider 1033 and a follower surface of each member are brought into abutment against each other. Thus, each member is independently operated.

The ink jet recording apparatus further preferably includes a second ink storage portion and a tube. The second ink storage portion such as a main tank has a capacity larger than that of the ink storage portion (first ink storage portion) such as a sub tank. The tube allows the ink to flow between the second ink storage portion and the ink storage portion. In consideration of a usage mode or the like in remote work at home, reduction in replacement frequency of an ink cartridge is also important in addition to downsizing of the apparatus. Accordingly, further provision of the second ink storage portion such as the main tank can reduce the ink replacement frequency while the increase in size of the apparatus main body is avoided. In the following, an ink jet recording apparatus in which only the first ink storage portion such as the sub tank bonded to the recording head is provided as the ink storage portion is also referred to as "first apparatus configuration." In the case of the first apparatus configuration, when the ink stored inside of the ink storage portion has been consumed, the ink storage portion is replaced with another ink storage portion (ink storage portion filled with an ink). Thus, as compared to a second apparatus configuration, the main tank and the tube can be omitted, and thus the weight of the ink jet recording apparatus can be reduced. Further, an ink jet recording apparatus in which the second ink storage portion such as the main tank having a capacity larger than that of the sub tank is further provided as the ink storage portion is also referred to as "second apparatus configuration." In the case of the second apparatus configuration, for example, when a connection portion for a tube is formed in the tank lid 33 of the recording unit 8 illustrated in FIG. 3, the ink storage portion 10 and the second ink storage portion such as the main tank can be connected to each other.

In the case of the second apparatus configuration, the ink replacement frequency is reduced as compared to the first apparatus configuration, and hence a period in which an ink in a stationary state is kept in the main tank becomes long. Further, in a case of a pigment ink, when the period in which the ink is kept in the stationary state becomes long, the pigment is liable to be settled. Degradation of an ejection property caused by sticking occurs because the ink dries in the flow path and the pigment aggregates. Thus, the degradation of the ejection property becomes more remarkable as an ink having a larger content of the pigment is used. In addition, depending on the usage state, the ejection misdirection after the long-term use of the second apparatus configuration is often larger than the ejection misdirection after the long-term use of the first apparatus configuration. Meanwhile, in the ink jet recording method of the present invention, even in the case of the second apparatus configuration, the ejection misdirection can be suppressed, and hence both of the reduction of the ink replacement frequency and the suppression of the ejection misdirection after the long-term use can be achieved.

Figure 3:
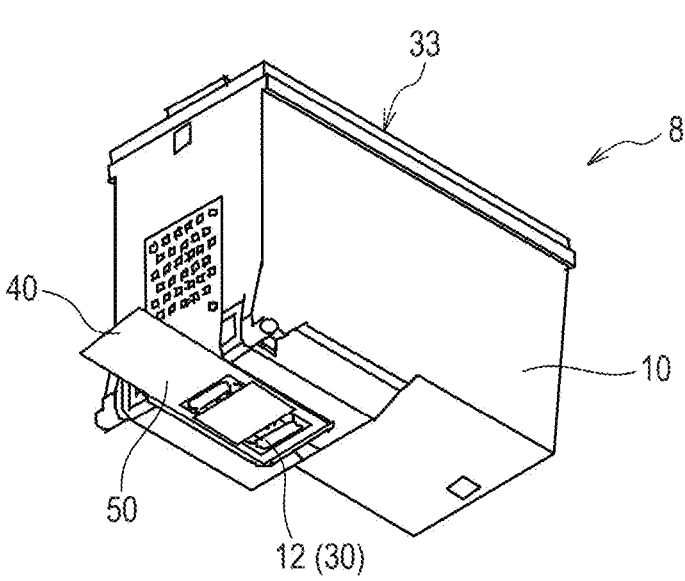
FIG. 3 is a perspective view for schematically illustrating an example of a recording unit.

FIG. 3 is a perspective view for schematically illustrating an example of the recording unit (ink cartridge). As illustrated in FIG. 3, the recording unit 8 includes: an ink storage portion 10 that is a casing formed from a material such as a thermoplastic resin; and a recording head 12 incorporated into the ink storage portion 10. In other words, the recording head 12 is formed integrally with the ink storage portion 10. The entirety of the recording unit 8 is reduced in size and weight because the recording head 12 is bonded to the ink storage portion 10 without through intermediation of any other member. The use of such recording unit 8 can reduce the size and weight of the entirety of the ink jet recording apparatus. The heat-radiating plate may be, for example, a plate formed from a material such as a metal oxide such as alumina. Although there is no need to interpose any other member such as a heat-radiating plate between the ink storage portion 10 and the recording head 12, an adhesion layer formed from an adhesive or the like, the layer being intended to fix the recording head 12 to the ink storage portion 10, may be present. An ink containing a pigment and a resin is stored in the ink storage portion 10. The recording head 12 has an ejection orifice surface 30 having formed therein an ejection orifice that ejects the ink supplied from the ink storage portion 10. A protective tape 50 including an adhesion layer formed from an adhesive, the protective tape being peeled at the time of the start of the initial use of the ink cartridge, is bonded to the ejection orifice surface 30 of the recording head 12. When a tab 40 serving as a non-adhesive portion that does not adhere to the recording head is provided to an end portion of the protective tape 50, the protective tape can be easily peeled.

Examples of the ink ejection system of the recording head include: a system including applying mechanical energy generated by a piezoelectric element or the like to the ink to eject the ink; and a system including applying thermal energy generated by an electro-thermal converter (heater) or the like to the ink to eject the ink. Any of the ink ejection systems may be adopted, but the system including applying thermal energy to the ink to eject the ink is more preferable.

The ejection orifice surface of the recording head is subjected to water-repellent treatment. A method for subjecting the ejection orifice surface to the water-repellent treatment may be, for example, a method including applying a water-repellent material to the surface with a spray or the like or a method including causing the water-repellent material to adhere to the surface through vacuum deposition or plasma polymerization. The water repellency of the ejection orifice surface may be evaluated by measuring the contact angle thereof with water. When the contact angle with the water is 70° or more, the surface can be judged to be "water-repellent." The contact angle with the water is preferably 90° or more. The contact angle with the water may be measured by using pure water (ion-exchanged water) and a general contact angle meter. The contact angle meter may be, for example, an automatic contact angle-measuring machine (product name: "CA-W", manufactured by Kyowa Interface Science Co., Ltd.).

The water-repellent material for subjecting the ejection orifice surface to the water-repellent treatment may be, for example, a compound of a fluorine-based resin. A water-repellent surface is preferably formed as a uniform resin film formed from such material, and the resin film is preferably free of a metal such as nickel. Examples of the fluorine-based resin may include a polytetrafluoroethylene resin and a fluorine resin having a cyclic structure. Specific examples of the compound of a fluorine-based resin may include products available from product name: "Polyflon PTFE" (manufactured by Daikin Industries, Ltd.), product name: "Teflon (trademark) PTFE" (manufactured by DuPont), and product name: "CYTOP" (manufactured by Asahi Glass Co., Ltd.). In addition, other resins each having a fluorine atom, such as a fluorinated epoxy resin, a fluorinated polyimide resin, a fluorinated polyamide resin, a fluorinated acrylic resin, a fluorinated urethane resin, a fluorinated siloxane resin and modified resins thereof, may be used as the compound of a fluorine-based resin.

A silicon (Si) atom-containing compound or a silicone-based resin may be used as the water-repellent material. Of those, a condensate of a hydrolyzable silane compound having a fluoroalkyl group and a hydrolyzable silane compound having a cationically polymerizable group is preferably used as the water-repellent material because a high degree of water repellency and durability are obtained. Further, a resin obtained by applying an active energy ray such as UV light to the condensate to cure the condensate may also be used. Those hydrolyzable silane compounds each have a hydrolyzable group such as an alkoxy group in its molecular structure. Examples of the cationically polymerizable group may include a cyclic ether group and a cyclic vinyl ether group.

The protective tape is a member to be used for suppressing the evaporation of a component that may evaporate in the ink such as water from the ejection orifice of the recording head. The protective tape includes the adhesion layer formed from the adhesive. Examples of the adhesive may include a silicone-based adhesive, an acrylic adhesive, a rubber-based adhesive and a urethane-based adhesive. Of those, a silicone-based adhesive or an acrylic adhesive is preferable, and an acrylic adhesive is more preferable. The rubber-based adhesive generally has a weak strength. Further, in some cases, the urethane-based adhesive is deteriorated by ink, and comes off during storage to be liable to be dissolved in the ink. As a result, when a liquid component such as water in the ink evaporates, the pigment or the resin may aggregate in the ink flow path. Thus, in some cases, the ejection misdirection is liable to occur. In contrast, the acrylic adhesive is preferable because, as compared to other adhesives, the contact angle with the ink of the ejection orifice surface after peeling is less liable to be decreased. The adhesion layer is formed on a surface of, for example, a sheet-shaped or film-shaped base member. As the base member, a resin material such as polyethylene terephthalate (PET) can be used.

The acrylic adhesive preferably contains a metal chelate-based crosslinking agent, and the ink preferably has a pH at 25° C. of 8.6 or more. When the acrylic adhesive containing the metal chelate-based crosslinking agent is brought into contact with an ink having a high pH for a long time period, a metal of coordination is liable to separate to cause deterioration. As a result, the adhesive may be easily wiped by the wiper, and is thus preferable.

Figure 4:
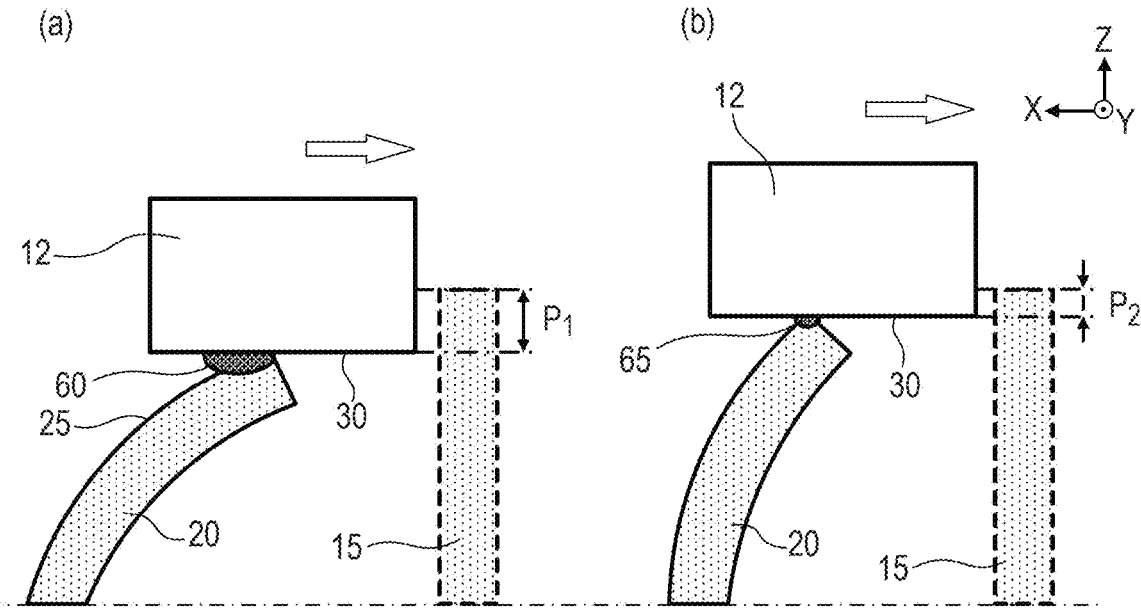
FIG. 4 is an explanatory view for schematically illustrating a movement of a wiper at the time of a cleaning operation.

The ink jet recording method of this embodiment includes a first cleaning sequence of wiping the ejection orifice surface of the recording head through use of one wiper having a blade shape. This first cleaning sequence includes a first wiping step and a second wiping step that are carried out successively to each other. FIG. 4 is an explanatory view for schematically illustrating the movement of the wiper at the time of a cleaning operation. (a) is a schematic explanatory view for illustrating the movement of the wiper in the first wiping step, and (b) is a schematic explanatory view for illustrating the movement of the wiper in the second wiping step. In the first wiping step, as illustrated in (a) of FIG. 4, for example, the height of the carriage having the recording head 12 mounted thereon is changed so that an entrance amount $P_1$ of the wiper with respect to the recording head 12 is set to a predetermined value. Thus, the wiper (wiper 15 before bending) is relatively largely bent. Then, the ejection orifice surface 30 of the recording head 12 is wiped with a body portion 25 of a bent wiper 20. In this manner, the ink droplet of the ejection orifice surface 30 can be spread and blended into an adhering adhesive 60.

In the second wiping step, as illustrated in (b) of FIG. 4, the ejection orifice surface 30 of the recording head 12 is wiped with an edge portion of the wiper 20. In the second wiping step, for example, the position of the carriage is raised to be higher than that in the first wiping step so that an entrance amount $P_2$ of the wiper with respect to the recording head 12 is set to be smaller than the entrance amount $P_1$ of the wiper at the time of the first wiping step. In this manner, a mixture 65 of the adhesive and the ink droplet blended in the first wiping step can be scraped off.

The entrance amount $P_1$ of the wiper at the time of the first wiping step is preferably 1.8 mm or less ((a) of FIG. 4). When the entrance amount $P_1$ of the wiper is more than 1.8 mm, a force applied by the abutment increases, and thus the ejection orifice surface may be easily scratched. In addition, the water-repellent surface is shaved due to the long-period use, and, in some cases, the effect of suppressing the ejection misdirection is reduced. The entrance amount $P_1$ of the wiper at the time of the first wiping step is preferably 1.0 mm or more. The entrance amount $P_2$ of the wiper at the time of the second wiping step is preferably 0.3 mm or more ((b) of FIG. 4). When the entrance amount $P_2$ of the wiper is less than 0.3 mm, an efficiency of removing the adhesive or the like is slightly reduced, and in some cases, the effect of suppressing the ejection misdirection is reduced. The entrance amount $P_2$ of the wiper at the time of the second wiping step is preferably less than 1.0 mm. In particular, the entrance amount of the wiper at the time of the first wiping step is preferably 1.0 mm or more to 1.8 mm or less, and the entrance amount of the wiper at the time of the second wiping step is preferably 0.3 mm or more to 1.0 mm or less.

An interval from the end of the first wiping step to the start of the second wiping step is preferably 5 seconds or more to 15 seconds or less. When the above-mentioned interval (time difference) is less than 5 seconds, the ink spread on the ejection orifice surface by the first wiping step may not be sufficiently blended into the adhesive. Thus, the efficiency of removing the adhesive or the like is slightly reduced, and hence, in some cases, the effect of suppressing the ejection misdirection is slightly reduced. Meanwhile, when the above-mentioned interval (time difference) is more than 15 seconds, the liquid component such as water in the ink adhering to the ejection orifice surface may evaporate, and hence the ink may be liable to stick. As a result, the efficiency of removing the adhesive or the like is slightly reduced, and hence, in some cases, the effect of suppressing the ejection misdirection is slightly reduced.

Each of the first wiping step and the second wiping step is preferably carried out two times or more. When the number of times that the first wiping step is carried out is less than two times, it becomes difficult to sufficiently spread the ink droplet on the ejection orifice surface, and hence, in some cases, the effect of suppressing the ejection misdirection is reduced. Further, when the number of times that the second wiping step is carried out is less than two times, in some cases, it becomes difficult to sufficiently remove the adhesive or the like adhering to the ejection orifice surface. Thus, in some cases, the effect of suppressing the ejection misdirection is reduced.

A material of the wiper preferably has rubber elasticity. Examples of the material include a rubber material (urethane rubber) formed from a urethane resin. A thickness of the wiper is preferably 0.5 mm or more to 1.5 mm or less, more preferably 0.8 mm or more to 1.2 mm or less. When the thickness of the wiper is less than 0.5 mm, in some cases, the efficiency of removing the adhesive or the like is reduced. Meanwhile, when the thickness of the wiper is more than 1.5 mm, the ejection orifice surface may be easily scratched. In addition, the water-repellent surface is shaved due to the long-period use, and hence, in some cases, the effect of suppressing the ejection misdirection is reduced. A height of the wiper (length from a fixed position of the wiper to a distal end of the wiper) is preferably 5.0 mm or more to 20.0 mm or less, more preferably 5.0 mm or more to 15.0 mm or less.

A speed of wiping the ejection orifice surface through use of the wiper is preferably 100 mm/s or more to 150 mm/s or less. When the speed of the wiping is less than 100 mm/s, the ejection orifice surface may be easily scratched. In addition, the water-repellent surface is shaved due to the long-period use, and hence, in some cases, the effect of suppressing the ejection misdirection is reduced. Meanwhile, when the speed of the wiping is more than 150 mm/s, the efficiency of removing the adhesive or the like is slightly reduced, and hence, in some cases, the effect of suppressing the ejection misdirection is reduced. The speeds of the wiping in the first wiping step, the second wiping step, and a third wiping step to be described later may each be set within the above-mentioned range, and may be the same as each other or different from each other.

The first cleaning sequence is preferably executed at least immediately after the protective tape is peeled. Specifically, the first cleaning sequence is preferably executed after the protective tape is peeled and before the recording is performed. When a certain amount of time elapses from the peeling of the protective tape, the adhesive remaining on the ejection orifice surface may dry and stick, and thus it may become difficult to remove the adhesive. As a result, in some cases, the effect of suppressing the ejection misdirection is reduced.

The ink jet recording method of this embodiment further preferably includes a second cleaning sequence to be executed after the first cleaning sequence. This second cleaning sequence preferably includes a third wiping step of wiping the ejection orifice surface with the edge portion of the wiper while warming the recording head. This third wiping step can be carried out in a procedure similar to that of the second wiping step described above except that the recording head is warmed. When the wiping is performed while the recording head is warmed, the deteriorated adhesive is easily peeled due to the heat, and hence the efficiency of removing the adhesive can be improved.

In order to warm the recording head, it is only needed to use a warming unit that can warm the ink in the recording head to a temperature higher than a recording environment temperature such as a room temperature (25° C.). Examples of such warming unit may include: a heater for ink temperature control arranged so as to be brought into contact with the recording head; and a heater for ink ejection. In order to warm the ink with the heater for ink ejection, for example, such a current that the ink is not ejected only needs to be repeatedly passed through the heater. The temperature of the ink in the recording head only needs to be higher than the environment temperature (25° C.), but is preferably 40° C. or more to 70° C. or less, more preferably 50° C. or more to 70° C. or less.

The first wiping step is preferably carried out only in the first cleaning sequence. That is, the second cleaning sequence preferably substantially includes no step of wiping the ejection orifice surface with the body portion of the wiper with the wiper being largely bent. When the step of wiping the ejection orifice surface with the body portion of the wiper with the entrance amount of the wiper being increased is carried out also in the second cleaning sequence, the ejection orifice surface may be easily scratched. In addition, the water-repellent surface is shaved due to the long-period use, and hence, in some cases, the effect of suppressing the ejection misdirection is reduced. For example, after a recovery operation of the recording head by sucking or recovering is performed, the wiping of the ejection orifice surface with the edge portion of the wiper (the second wiping step) is preferably carried out.
(Aqueous Ink)

In the ink jet recording method of the present invention, an ink containing a pigment and a resin is used. The method includes a step of recording an image by applying the ink ejected from an ejection orifice to a recording medium. Examples of the ink include a black ink, a cyan ink, a magenta ink and a yellow ink. In the present invention, the step of applying the ink to the recording medium only needs to be performed, and different processing (step of applying a reaction liquid reacting with the ink, step of curing the image through irradiation of an active energy ray or the like, step of heating the image, or the like) does not need to be performed. Thus, the ink does not need to contain a component that cures by the reaction agent or the active energy ray, and further does not need to use both of the ink and the reaction liquid. Now, components and the like for forming the ink are described.
[Coloring Material]

A pigment is used as a coloring material of the ink. Through use of the ink containing the pigment, the adhesive strongly adhering to the ejection orifice surface can be shaved off. Examples of the pigment may include: inorganic pigments such as carbon black; and organic pigments, such as an azo pigment, a phthalocyanine pigment, a quinacridone pigment, an isoindolinone pigment, an imidazolone pigment, a diketopyrrolopyrrole pigment, a dioxazine pigment, and a perinone pigment. Of those, carbon black is preferably used. Out of the pigments, carbon black is particularly hard, and hence, through use of the ink containing carbon black, the adhesive adhering to the ejection orifice surface can be shaved off more efficiently.

The content (% by mass) of the pigment in the aqueous ink is preferably 0.50% by mass or more to 10.00% by mass or less, more preferably 1.00% by mass or more to 8.00% by mass or less with respect to the total mass of the ink.

Examples of a dispersion system for the pigment may include a resin-dispersed pigment using a resin (resin dispersant) as a dispersant and a self-dispersible pigment having a hydrophilic group bonded to its particle surface. In addition, a resin-bonded pigment having a resin-containing organic group chemically bonded to its particle surface, a microcapsule pigment whose particle surface is covered with, for example, a resin, or the like may be used. Of those, it is particularly preferable to use a resin-dispersed pigment using a resin dispersant having a hydrophobic portion and a hydrophilic portion so that the hydrophobic portion of the resin dispersant is adsorbed to the particle surface of the pigment and the pigment is dispersed by the hydrophilic portion.

A dispersant that can disperse the pigment in an aqueous medium through the action of an anionic group is preferably used as a resin dispersant for dispersing the pigment in the aqueous medium. A resin to be described later, in particular, a water-soluble resin may be used as the resin dispersant. When the resin-dispersed pigment is used, the mass ratio of the content (% by mass) of the pigment in the ink to the content (% by mass) of the resin dispersant therein is preferably 0.3 times or more to 10.0 times or less.

A pigment having an anionic group, such as a carboxylic acid group, a sulfonic acid group or a phosphonic acid group, bonded to its particle surface directly or through any other atomic group (—R—) may be used as the self-dispersible pigment. The anionic group may be any one of an acid type or a salt type. When the group is a salt type, the group may be in any one of a state in which part of the group dissociates or a state in which the entirety thereof dissociates. When the anionic group is a salt type, examples of a cation serving as a counterion may include an alkali metal cation, ammonium and an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

[Resin]

The ink contains a resin such as water-soluble resin. The content (% by mass) of the resin in the ink is preferably 0.10% by mass or more to 20.00% by mass or less, more preferably 0.50% by mass or more to 15.00% by mass or less with respect to the total mass of the ink. The resin may be added to the ink (i) for stabilizing the dispersed state of the pigment, that is, as a resin dispersant or an aid therefor. In addition, the resin may be added to the ink (ii) for improving the various characteristics of an image to be recorded. Examples of the form of the resin may include a block copolymer, a random copolymer, a graft copolymer and a combination thereof. Further, the resin may be a water-soluble resin that can be dissolved in an aqueous medium or may be a resin particle to be dispersed in the aqueous medium. Of those, a water-soluble resin is preferable and the water-soluble resin is preferably a resin dispersant for dispersing the pigment.

Examples of the resin may include an acrylic resin, a urethane resin and an olefin resin. Of those, an acrylic resin and a urethane resin are preferable, and an acrylic resin is more preferable. The acrylic resin preferably has, as constituent units, a hydrophilic unit as a hydrophilic part and a hydrophobic unit as a hydrophobic part. The hydrophilic unit is a unit having a hydrophilic group such as an anionic group. The hydrophilic unit may be formed by, for example, polymerizing a hydrophilic monomer having a hydrophilic group. Examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of these acidic monomers. A cation for forming the salt of the acidic monomer may be, for example, a lithium, sodium, potassium, ammonium or organic ammonium ion. The hydrophobic unit is a unit free of a hydrophilic group such as an anionic group. The hydrophobic unit may be formed by, for example, polymerizing the hydrophobic monomer free of a hydrophilic group such as anionic group. Examples of the hydrophobic monomer may include: monomers each having an aromatic ring, such as styrene, α-methylstyrene and benzyl (meth)acrylate; and (meth)acrylic acid ester-based monomers, such as methyl (meth)acrylate, butyl (meth) acrylate and 2-ethylhexyl (meth)acrylate.

Of those, an acrylic resin including a hydrophilic unit derived from (meth)acrylic acid and a hydrophobic unit derived from at least one kind selected from the group consisting of a monomer having an aromatic ring and a (meth)acrylic acid ester-based monomer is preferable. In particular, an acrylic resin including a hydrophilic unit derived from (meth)acrylic acid and a hydrophobic unit derived from at least one of a styrene monomer or an α-methylstyrene monomer is preferable. Those acrylic resins can each be suitably used as a resin dispersant for dispersing the pigment because the resins each easily interact with the pigment.

The urethane resin may be obtained by, for example, causing a polyisocyanate and a polyol to react with each other. In addition, a chain extender may be further caused to react with the reaction product. Examples of the olefin resin may include polyethylene and polypropylene.

The phrase "resin is water-soluble" as used herein means that when the resin is neutralized with an alkali in an amount equivalent to its acid value, the resin is present in an aqueous medium under a state in which the resin does not form any particle whose particle diameter may be measured by a dynamic light scattering method. Whether or not a resin is water-soluble may be determined in accordance with a method described below. First, a liquid (resin solid content: 10% by mass) containing a resin neutralized with an alkali (e.g., sodium hydroxide or potassium hydroxide) equivalent to its acid value is prepared. Next, the prepared liquid is diluted 10-fold (based on a volume) with pure water to prepare a sample solution. Then, when the particle diameter of the resin in the sample solution is measured by a dynamic light scattering method, and a particle having a particle diameter is not measured, the resin may be determined to be water-soluble. Meanwhile, when a particle having a particle diameter is measured, the resin may be determined as "resin particle" (that is, "water dispersible resin"). Measurement conditions in this case may be set, for example, as described below.

[Measurement Conditions]

Set Zero: 30 seconds

Number of times of measurement: three times

Measurement time: 180 seconds

A particle size analyzer based on a dynamic light scattering method (e.g., product name "UPA-EX150", manufactured by Nikkiso Co., Ltd.) or the like may be used as a particle size distribution-measuring apparatus. The particle size distribution-measuring apparatus to be used, the measurement conditions and the like are of course not limited to the foregoing.

[Aqueous Medium]

The ink is an aqueous ink containing at least water as an aqueous medium. The water or an aqueous medium that is a mixed solvent of the water and a water-soluble organic solvent may be incorporated into the ink. Deionized water (ion-exchanged water) is preferably used as the water. The content (% by mass) of the water in the ink is preferably 50.00% by mass or more to 95.00% by mass or less with respect to the total mass of the ink. Solvents that may be used in inks for ink jet, such as alcohols, glycols, (poly) alkylene glycols, nitrogen-containing compounds and sulfur-containing compounds, may each be used as the water-soluble organic solvent. The content (% by mass) of the water-soluble organic solvent in the ink is preferably 3.00% by mass or more to 50.00% by mass or less with respect to the total mass of the ink.

[Surfactant]

The ink preferably further contains a surfactant. Examples of the surfactant may include an anionic surfactant, a cationic surfactant, a nonionic surfactant, an amphoteric surfactant and other surfactants. Of those, a nonionic surfactant is preferably used.

The content (% by mass) of the surfactant in the ink is preferably 0.10% by mass or more to 5.00% by mass or less, more preferably 0.10% by mass or more to 2.00% by mass or less with respect to the total mass of the ink. In particular, the content is particularly preferably 0.10% by mass or more to 1.00% by mass or less.

[Other Component]

A water-soluble organic compound that is a solid at normal temperature, for example, polyhydric alcohols, such as trimethylolpropane and trimethylolethane, urea and a derivative thereof, or saccharides and a derivative thereof, may be incorporated into the ink as required in addition to the above-mentioned components. Further, as required, various additives, such as an antifoam agent, a pH adjuster, a viscosity adjuster, a rust preventive, a preservative, a fungicide, an antioxidant and a reduction inhibitor, may also be incorporated into the ink.

[Physical Properties of Ink]

The ink is an aqueous ink to be applied to an ink jet system. Accordingly, from the viewpoint of reliability, it is preferable that the physical property values of the ink be appropriately controlled. Specifically, the static surface tension of the ink at 25° C. is preferably 28 mN/m or more to 45 mN/m or less. In addition, the viscosity of the ink at 25° C. is preferably 1.0 mPa·s or more to 5.0 mPa·s or less, more preferably 1.0 mPa·s or more to 3.0 mPa·s or less. The pH of the ink at 25° C. is preferably 5.0 or more to 9.5 or less. As described above, when the protective tape including the adhesion layer formed from the acrylic adhesive containing the metal chelate-based crosslinking agent is used, the pH of the ink is preferably 8.6 or more, more preferably 8.9 or more to 9.3 or less.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass unless otherwise stated.

<Preparation of Pigment Dispersion Liquid>

(Pigment Dispersion Liquid 1)

A solution obtained by dissolving 5.0 g of concentrated hydrochloric acid in 5.5 g of water was brought into a state of being cooled to 5° C., and 1.5 g of 4-amino-1,2-benzenedicarboxylic acid was added under this state. While the temperature of the solution was kept at 10° C. or less by loading a vessel containing the solution into an ice bath, followed by stirring, a solution obtained by dissolving 1.8 g of sodium nitrite in 9.0 g of water at 5° C. was added thereto. After stirring for 15 minutes, 6.0 g of carbon black having a specific surface area of 250 m²/g and a DBP oil absorption of 140 mL/100 g was added under stirring. A slurry was obtained by further stirring for 15 minutes. The resultant slurry was filtered with filter paper (product name: STANDARD FILTER PAPER No. 2; manufactured by Advantec) and then its particle was sufficiently washed with water, followed by drying in an oven at 110° C. After that, a sodium ion was substituted with a potassium ion by an ion exchange method to prepare a self-dispersible pigment in which a —C₆H₃—(COOK)₂ group was bonded to the particle surface of a pigment. An appropriate amount of water was added thereto to adjust the content of the pigment, to provide a pigment dispersion liquid 1 having a content of the pigment of 15.00%.

(Pigment Dispersion Liquid 2)

A styrene-acrylic acid copolymer having an acid value of 90 mgKOH/g and a weight-average molecular weight of 10,000 was neutralized with a 10% potassium hydroxide aqueous solution. 10.0 Parts of carbon black (specific surface area of 220 m²/g and DBP oil absorption of 100 mL/100 g), 2.0 parts of the neutralized styrene-acrylic acid copolymer (solid content) and 88.0 parts of ion-exchanged water were mixed to provide a mixture. The resultant mixture was dispersed with a sand grinder for 1 hour and then a coarse particle was removed by centrifugation treatment. Further, the supernatant was filtered with a microfilter having a pore size of 3.0 μm (manufactured by FUJIFILM Corporation) under pressure to provide a pigment dispersion liquid 2 in a state in which carbon black was dispersed in the water by the resin. The content of the pigment in the pigment dispersion liquid 2 was 15.00% and the content of the resin dispersant therein was 3.00%.

(Pigment Dispersion Liquid 3)

A styrene-acrylic acid copolymer having an acid value of 120 mgKOH/g and a weight-average molecular weight of 10,000 was neutralized with a 10% potassium hydroxide aqueous solution. 10.0 Parts of C.I. Pigment Blue 15:3, 3.0 parts of the neutralized styrene-acrylic acid copolymer (solid content) and 85.0 parts of ion-exchanged water were mixed to provide a mixture. The resultant mixture was dispersed through use of a sand grinder for 1 hour and then a coarse particle was removed by centrifugation treatment. Further, the supernatant was filtered with a microfilter having a pore size of 3.0 μm (manufactured by FUJIFILM Corporation) under pressure to provide a pigment dispersion liquid 3 in a state in which C.I. Pigment Blue 15:3 was dispersed in the water by the resin. The content of the pigment in the pigment dispersion liquid 3 was 15.00% and the content of the resin dispersant therein was 3.00%.

(Pigment Dispersion Liquid 4)

A pigment dispersion liquid 4 was obtained similarly to the pigment dispersion liquid 3 described above except that C.I. Pigment Red 122 was used instead of C.I. Pigment Blue 15:3. The content of the pigment in the pigment dispersion liquid 4 was 15.00% and the content of the resin dispersant therein was 3.00%.

(Pigment Dispersion Liquid 5)

A pigment dispersion liquid 5 was obtained similarly to the pigment dispersion liquid 3 described above except that C.I. Pigment Yellow 74 was used instead of C.I. Pigment Blue 15:3. The content of the pigment in the pigment dispersion liquid 5 was 15.00% and the content of the resin dispersant therein was 3.00%.

<Preparation of Dye Aqueous Solution>

C.I. Direct Blue 199 was dissolved in ion-exchanged water, and then an acid was added thereto to precipitate the dye. The precipitated dye was filtered and collected, and thus a wet cake of the dye in a free acid form was obtained. The obtained wet cake was added to ion-exchanged water, and then an aqueous solution containing sodium hydroxide was added in an equivalent molar amount to an anionic group of the dye to completely neutralize the anionic group and dissolve the dye. An appropriate amount of ion-exchanged water was further added, and thus a dye aqueous solution having a dye content of 15.00% was obtained.

<Preparation of Resin>

(Acrylic Resin 1)

81.0 Parts of styrene and 19.0 parts of acrylic acid were copolymerized in accordance with an ordinary method to synthesize an acrylic resin 1. A carboxylic acid group was neutralized with potassium hydroxide whose molar amount was equivalent to the acid value of the acrylic resin 1, and an appropriate amount of pure water was added to the solution to provide a liquid containing the acrylic resin 1 in which the content of the resin was 20.00%. The acid value of the acrylic resin 1 was 148 mgKOH/g and the weight-average molecular weight thereof measured by gel permeation chromatography was 10,000.

(Urethane Resin)

A four-necked flask including a stirrer, a temperature gauge, a nitrogen gas-introducing pipe and a reflux pipe was prepared. 41.5 Parts of isophorone diisocyanate, 40.6 parts of polypropylene glycol, 15.7 parts of dimethylolpropionic acid and 300.0 parts of methyl ethyl ketone were loaded into the four-necked flask. Then, the mixture was subjected to a reaction at 80° C. for 6 hours under a nitrogen gas atmosphere. Next, 3.6 parts of polyamine was added thereto, and the resultant was subjected to a reaction at 80° C., to thereby provide a reaction liquid. The resultant reaction liquid was cooled to 40° C., and then ion-exchanged water was added. An aqueous solution of potassium hydroxide was added under stirring at a high speed with a homomixer to provide a liquid. Methyl ethyl ketone was evaporated by heating the resultant liquid under reduced pressure. Thus, a liquid containing a urethane resin having a urethane resin content (solid content) of 20.00% was obtained.

(Acrylic Resin 2)

79.4 Parts of ion-exchanged water and 0.2 parts of potassium persulfate were mixed to prepare a solution. In addition, 16.7 parts of butyl methacrylate, 0.4 parts of methacrylic acid, 3.0 parts of ethylene glycol methyl diacrylate, and 0.3 parts of a product available under the product name: "Aqualon KH-05" (manufactured by DKS Co., Ltd.) were mixed to prepare an emulsion. Under a nitrogen atmosphere, the prepared emulsion was dropped into the above-mentioned solution over 1 hour and the mixture was subjected to a polymerization reaction while being stirred at 80° C. After that, the polymer was further stirred for 2 hours. After the polymer had been cooled to room temperature, ion-exchanged water and an aqueous solution of potassium hydroxide were added to the polymer to adjust its pH to 8.5. Thus, a liquid containing an acrylic resin 2 having a content of the resin particle of 20.00% was obtained.

<Preparation of Ink>

Respective components (unit: %) shown in the upper section of Table 1 were mixed and sufficiently stirred. After that, the mixtures were filtered with a microfilter having a pore size of 3.0 μm (manufactured by FUJIFILM Corporation) under pressure to prepare respective inks. In Table 1, the numerical value attached to polyethylene glycol represents the number-average molecular weight, and the term "ACETYLENOL E60" is a product name of an acetylene glycol-based nonionic surfactant (manufactured by Kawaken Fine Chemicals Co., Ltd.). The content of the pigment and, the content of resin and pH of the resultant ink is shown in the lower section of Table 1. The pH of the ink was adjusted by adding a 1 mol/L acetic acid aqueous solution or an 8 mol/L aqueous solution of potassium hydroxide. The usage amount of the acetic acid aqueous solution or the aqueous solution of potassium hydroxide that was used for the adjustment of the pH are shown while being included in the content of the pure water.

TABLE 1

| | Composition and characteristics of ink | | | | | | | | | | | | | |
| | Ink | | | | | | | | | | | | | |
| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Pigment dispersion liquid 1 | 23.33 | | 23.33 | 23.33 | | | | 23.33 | 23.33 | 23.33 | 23.33 | 23.33 | | 23.33 |
| Pigment dispersion liquid 2 | | 23.33 | | | | | | | | | | | | |
| Pigment dispersion liquid 3 | | | | | 23.33 | | | | | | | | | |
| Pigment dispersion liquid 4 | | | | | | 23.33 | | | | | | | | |
| Pigment dispersion liquid 5 | | | | | | | 23.33 | | | | | | | |
| Dye aqueous solution | | | | | | | | | | | | | 23.33 | |
| Liquid containing acrylic resin 1 | 2.50 | 2.50 | | | | | | 2.50 | 2.50 | 2.50 | 2.50 | 2.50 | | |
| Liquid containing urethane resin | | | 2.50 | | | | | | | | | | | |
| Liquid containing acrylic resin 2 | | | | 2.50 | 2.50 | 2.50 | 2.50 | | | | | | 2.50 | |
| Glycerin | 10.00 | 10.00 | 10.00 | 10.00 | 10.00 | 10.00 | 10.00 | 10.00 | 10.00 | 10.00 | 10.00 | 10.00 | 10.00 | 10.00 |
| Triethylene glycol | 13.00 | 13.00 | 13.00 | 13.00 | 13.00 | 13.00 | 13.00 | 13.00 | 13.00 | 13.00 | 13.00 | 13.00 | 13.00 | 13.00 |
| 1,5-Pentanediol | 1.00 | 1.00 | 1.00 | 1.00 | 1.00 | 1.00 | 1.00 | 1.00 | 1.00 | 1.00 | 1.00 | 1.00 | 1.00 | 1.00 |
| Polyethylene glycol 1000 | 1.00 | 1.00 | 1.00 | 1.00 | 1.00 | 1.00 | 1.00 | 1.00 | 1.00 | 1.00 | 1.00 | 1.00 | 1.00 | 1.00 |
| ACETYLENOL E100 | 0.50 | 0.50 | 0.50 | 0.50 | 0.50 | 0.50 | 0.50 | 0.50 | 0.50 | 0.50 | 0.50 | 0.50 | 0.50 | 0.50 |

TABLE 1-continued

| | Composition and characteristics of ink | | | | | | | | | | | | | |
|---|---|---|---|---|---|---|---|---|---|---|---|---|---|
| | Ink | | | | | | | | | | | | | |
| | 1 | 2 | 3 | 4 | 5 | 6 | 7 | 8 | 9 | 10 | 11 | 12 | 13 | 14 |
| Pure water | 48.67 | 48.67 | 48.67 | 48.67 | 48.67 | 48.67 | 48.67 | 48.67 | 48.67 | 48.67 | 48.67 | 48.67 | 48.67 | 51.17 |
| Content (%) of pigment | 3.50 | 3.50 | 3.50 | 3.50 | 3.50 | 3.50 | 3.50 | 3.50 | 3.50 | 3.50 | 3.50 | 3.50 | 0.00 | 3.50 |
| Content (%) of resin | 0.50 | 1.20 | 0.50 | 0.50 | 1.20 | 1.20 | 1.20 | 0.50 | 0.50 | 0.50 | 0.50 | 0.50 | 0.50 | 0.00 |
| pH | 9.0 | 9.0 | 9.0 | 9.0 | 9.0 | 9.0 | 9.0 | 8.4 | 8.6 | 8.9 | 9.3 | 9.5 | 9.0 | 9.0 |

<Configuration of Recording Unit (Ink Cartridge)>

Such a recording unit (ink cartridge) as illustrated in FIG. 3 in which a recording head of such a system as to apply thermal energy to eject an ink was directly attached to the ink storage portion 10 without through intermediation of any heat-radiating plate was prepared. In the recording element substrate forming the recording head, an ejection orifice array formed of 384 ejection orifices arrayed at an array density of 600 dpi is arranged. The mass of an ink droplet ejected from one ejection orifice is 5.5 ng. As the recording head, a recording head in which an ejection orifice surface formed from an epoxy resin was subjected to water-repellent treatment by a water repellent was used. The water repellent is a resin obtained by curing a condensate of a hydrolyzable silane compound having a fluoroalkyl group (compound having a fluoromethyl group and a metoxy group) and a hydrolyzable silane compound having a cationically polymerizable group (compound having an epoxy group and an ethoxy group). Then, the protective tape including the adhesion layer was bonded to the ejection orifice surface of the recording head so that the recording unit was produced. The characteristics of the obtained recording unit are shown in Table 2.

TABLE 2

| Characteristics of recording unit | | |
|---|---|---|
| Recording unit | Protective tape | Adhesive for forming adhesion layer of protective tape |
| 1 | Present | Acrylic adhesive containing metal chelate-based crosslinking agent |
| 2 | Present | Urethane-based adhesive |
| 3 | Present | Rubber-based adhesive |
| 4 | Present | Silicone-based adhesive |
| 5 | Present | Acrylic adhesive containing epoxy-based crosslinking agent |
| 6 | Absent | — |

<Evaluation>

A product name "PIXUS TS5130S" (manufactured by Canon Inc.) was prepared as an apparatus 1, which is an ink jet recording apparatus of a type in which, when an ink stored inside of the ink storage portion (ink cartridge) has been consumed, the ink storage portion is replaced with a new ink storage portion filled with the ink. Further, a product name "G3370" (manufactured by Canon Inc.) was prepared as an apparatus 2, which is an ink jet recording apparatus of a type in which an ink storage portion (sub tank) on a carriage and an ink storage portion (main tank) placed in the apparatus are connected to each other by a tube through which the ink flows. Into each of those ink jet recording apparatus, a blade-shaped wiper (abutment pressure: 1.2 kgf/mm²) formed from a urethane resin for wiping the ejection orifice surface of the recording head was incorporated. The entrance amount of the wiper in the first wiping step was set to 1.3 mm, and the entrance amount of the wiper in each of the second wiping step and the third wiping step was set to 1.0 mm. In Comparative Example 4, an ink jet recording apparatus having mounted thereon two wipers having the entrance amounts of 1.3 mm and 1.0 mm was used. A time difference of the passage of the two wipers was 0.03 seconds. Immediately after the protective tape was peeled from the recording unit shown in Table 3 (Table 3-1 to Table 3-4), the recording unit was set to the carriage of the above-mentioned recording apparatus, and a cleaning sequence to be described later was executed. Then, evaluation of items to be described later was performed.

First, a first cleaning sequence was performed under the conditions shown in Tables 3-1 and 3-2. The details of the conditions are as follows. In the first cleaning sequence, the first wiping step of wiping the ejection orifice surface with the body portion of the bent wiper was carried out. Then, the height of the carriage was changed, and the second wiping step of wiping the ejection orifice surface with the edge portion of the wiper was carried out. In Examples 5 and 41, the recording unit was set to the recording apparatus immediately after the protective tape was peeled, and a nozzle check pattern of "PIXUS TS5130S" or "G3370" was recorded for five sheets, and then the first cleaning sequence was executed.

Condition 1: Two times of first wiping step→Two times of second wiping step

Condition 2: One time of first wiping step→One time of second wiping step

Condition 3: One time of first wiping step→Two times of second wiping step

Condition 4: Two times of first wiping step→One time of second wiping step

Condition 5: One time of first wiping step→One time of second wiping step→One time of first wiping step→One time of second wiping step Condition 6: Four times of first wiping step Condition 7: Four times of second wiping step Condition 8: One time with a pair of two wipers.

Next, under the condition shown in Table 3, as the second cleaning sequence, the third wiping step of wiping the ejection orifice surface with the edge portion (or the body portion) of the wiper was carried out. In examples shown as "YES" in the "warming of the recording head" column in Table 3, at the time of carrying out the second cleaning sequence, the temperature of the ink in the recording head was increased to 60° C.

In this Example, the recording duty of a solid image recorded under the following condition is defined as 100%: two ink droplets having a mass per droplet of 5.5 ng are applied to a unit region measuring 1/600 inch by 1/600 inch. The evaluation conditions are shown in Table 3. In the present invention, in evaluation criteria for each of the following items, while levels "AA", "A" and "B" were defined as acceptable levels, a level "C" was defined as an unacceptable level. The evaluation results are shown in Table 3.

(Ejection Misdirection at Time of Start of Initial Use)

Each ink was evaporated by 10% and condensed to prepare a condensed ink. The prepared ink was put into a container subjected to fluorine treatment, and was stored at 70° C. for 1 month. The stored condensed ink was used for evaluation in order to evaluate a state of the ejection misdirection under a stricter condition. The ink after storage was injected into the ink storage portion of the recording unit, and then the recording unit was set to the recording apparatus. Then, the cleaning of the ejection orifice surface was carried out under conditions shown in Table 3. After that, the nozzle check pattern of "PIXUS TS5130S" or "G3370" was recorded on each of glossy paper, coated paper, and plain paper. As the glossy paper, a product name "Photo Paper Glossy&Gold GL-101" (manufactured by Canon Inc.) was used. As the coated paper, "High Quality Dedicated Paper HR-101" (manufactured by Canon Inc.) was used. As the plain paper, a product name "PPC Sheet CS-680" (manufactured by Canon Inc.) was used. The three kinds of nozzle check patterns were visually observed, and the ejection misdirection at the time of start of initial use was evaluated in accordance with the evaluation criteria shown below.

AA: No misdirection was caused in the nozzle check pattern in any of the three kinds of recording media.

A: Misdirection was caused in the glossy paper, but no misdirection was caused in the coated paper and the plain paper.

B: Misdirection was caused in the glossy paper and the coated paper, but no misdirection was caused in the plain paper.

C: Misdirection was caused in all of the three kinds of recording media.

(Ejection Misdirection After Long-Period Use)

After the evaluation of the "ejection misdirection at time of start of initial use" described above was performed, the nozzle check pattern of "PIXUS TS5130S" or "G3370" was recorded on 15,000 recording media (product name "High Quality Dedicated Paper HR-101," manufactured by Canon Inc.). The nozzle check pattern recorded on the 15,000th sheet was visually observed, and the ejection misdirection after the long-period use was evaluated in accordance with the evaluation criteria shown below.

A: No ejection misdirection was caused in the nozzle check pattern recorded on the 15,000th recording medium.

C: Ejection misdirection was caused in the nozzle check pattern recorded on the 15,000th recording medium.

TABLE 3-1

| | | | | | Evaluation conditions | | |
| --- | --- | --- | --- | --- | --- | --- | --- |
| | | Apparatus | Ink | Recording unit | Thickness (mm) of wiper (mm) | Speed (mm/s) of wiping (mm/s) | First cleaning sequence Timing |
| Example | 1 | 1 | 1 | 1 | 1.0 | 120 | At time of start of initial use |
| | 2 | 1 | 2 | 1 | 1.0 | 120 | At time of start of initial use |
| | 3 | 1 | 3 | 1 | 1.0 | 120 | At time of start of initial use |
| | 4 | 1 | 4 | 1 | 1.0 | 120 | At time of start of initial use |
| | 5 | 1 | 1 | 1 | 1.0 | 120 | After start of recording |
| | 6 | 1 | 1 | 1 | 1.0 | 120 | At time of start of initial use |
| | 7 | 1 | 1 | 1 | 1.0 | 120 | At time of start of initial use |
| | 8 | 1 | 1 | 1 | 1.0 | 120 | At time of start of initial use |
| | 9 | 1 | 1 | 1 | 1.0 | 120 | At time of start of initial use |
| | 10 | 1 | 1 | 1 | 1.0 | 120 | At time of start of initial use |
| | 11 | 1 | 1 | 1 | 1.0 | 120 | At time of start of initial use |
| | 12 | 1 | 1 | 1 | 1.0 | 120 | At time of start of initial use |
| | 13 | 1 | 1 | 1 | 1.0 | 120 | At time of start of initial use |
| | 14 | 1 | 1 | 1 | 0.4 | 120 | At time of start of initial use |
| | 15 | 1 | 1 | 1 | 0.5 | 120 | At time of start of initial use |
| | 16 | 1 | 1 | 1 | 0.8 | 120 | At time of start of initial use |
| | 17 | 1 | 1 | 1 | 1.2 | 120 | At time of start of initial use |
| | 18 | 1 | 1 | 1 | 1.5 | 120 | At time of start of initial use |
| | 19 | 1 | 1 | 1 | 1.6 | 120 | At time of start of initial use |
| | 20 | 1 | 1 | 1 | 1.0 | 120 | At time of start of initial use |

TABLE 3-1-continued

| | | | | Evaluation conditions | | |
| | | | | | | |
| | Apparatus | Ink | Recording unit | Thickness (mm) of wiper (mm) | Speed (mm/s) of wiping (mm/s) | First cleaning sequence Timing |
|---|---|---|---|---|---|---|
| 21 | 1 | 1 | 1 | 1.0 | 120 | At time of start of initial use |
| 22 | 1 | 1 | 1 | 1.0 | 120 | At time of start of initial use |
| 23 | 1 | 1 | 1 | 1.0 | 120 | At time of start of initial use |
| 24 | 1 | 1 | 1 | 1.0 | 90 | At time of start of initial use |

TABLE 3-2

Evaluation conditions and evaluation results

| | | Evaluation conditions | | | | Evaluation results | |
| | | First cleaning sequence | | Second cleaning sequence | | | |
| | | | Time | | | | |
| | | Condition | difference (second) between first and second wiping steps | Third wiping step | Warning of recording head | Ejection misdirection at time of start of initial use | Ejection misdirection after long-term use |
|---|---|---|---|---|---|---|---|
| Example | 1 | 1 | 10 | Edge portion | YES | AA | A |
| | 2 | 1 | 10 | Edge portion | YES | AA | A |
| | 3 | 1 | 10 | Edge portion | YES | AA | A |
| | 4 | 1 | 10 | Edge portion | YES | AA | A |
| | 5 | 1 | 10 | Edge portion | YES | A | A |
| | 6 | 1 | 10 | Body portion | YES | A | B |
| | 7 | 1 | 10 | NO | YES | A | A |
| | 8 | 1 | 10 | Edge portion | NO | A | A |
| | 9 | 1 | 10 | NO | NO | A | A |
| | 10 | 1 | 4 | Edge portion | YES | A | A |
| | 11 | 1 | 5 | Edge portion | YES | AA | A |
| | 12 | 1 | 15 | Edge portion | YES | AA | A |
| | 13 | 1 | 16 | Edge portion | YES | A | A |
| | 14 | 1 | 10 | Edge portion | YES | A | A |
| | 15 | 1 | 10 | Edge portion | YES | AA | A |
| | 16 | 1 | 10 | Edge portion | YES | AA | A |
| | 17 | 1 | 10 | Edge portion | YES | AA | A |
| | 18 | 1 | 10 | Edge portion | YES | AA | A |
| | 19 | 1 | 10 | Edge portion | YES | AA | B |
| | 20 | 2 | 10 | Edge portion | YES | A | A |
| | 21 | 3 | 10 | Edge portion | YES | A | A |
| | 22 | 4 | 10 | Edge portion | YES | A | A |
| | 23 | 5 | 10 | Edge portion | YES | AA | A |
| | 24 | 1 | 10 | Edge portion | YES | AA | B |

TABLE 3-3

Evaluation conditions

| | | | | | Evaluation conditions | | |
| | | Apparatus | Ink | Recording unit | Thickness (mm) of wiper (mm) | Speed (mm/s) of wiping (mm/s) | First cleaning sequence Timing |
|---|---|---|---|---|---|---|---|
| Example | 25 | 1 | 1 | 1 | 1.0 | 100 | At time of start of initial use |
| | 26 | 1 | 1 | 1 | 1.0 | 150 | At time of start of initial use |

TABLE 3-3-continued

| | | Apparatus | Ink | Recording unit | Thickness (mm) of wiper (mm) | Speed (mm/s) of wiping (mm/s) | First cleaning sequence Timing |
|---|---|---|---|---|---|---|---|
| | | | | | Evaluation conditions | | |
| | 27 | 1 | 1 | 1 | 1.0 | 160 | At time of start of initial use |
| | 28 | 1 | 5 | 1 | 1.0 | 120 | At time of start of initial use |
| | 29 | 1 | 6 | 1 | 1.0 | 120 | At time of start of initial use |
| | 30 | 1 | 7 | 1 | 1.0 | 120 | At time of start of initial use |
| | 31 | 1 | 1 | 2 | 1.0 | 120 | At time of start of initial use |
| | 32 | 1 | 1 | 3 | 1.0 | 120 | At time of start of initial use |
| | 33 | 1 | 1 | 4 | 1.0 | 120 | At time of start of initial use |
| | 34 | 1 | 1 | 5 | 1.0 | 120 | At time of start of initial use |
| | 35 | 1 | 8 | 1 | 1.0 | 120 | At time of start of initial use |
| | 36 | 1 | 9 | 1 | 1.0 | 120 | At time of start of initial use |
| | 37 | 1 | 10 | 1 | 1.0 | 120 | At time of start of initial use |
| | 38 | 1 | 11 | 1 | 1.0 | 120 | At time of start of initial use |
| | 39 | 1 | 12 | 1 | 1.0 | 120 | At time of start of initial use |
| | 40 | 2 | 1 | 1 | 1.0 | 120 | At time of start of initial use |
| | 41 | 1 | 8 | 2 | 0.4 | 90 | After start of recording |
| Comparative Example | 1 | 1 | 13 | 1 | 1.0 | 120 | At time of start of initial use |
| | 2 | 1 | 1 | 1 | 1.0 | 120 | At time of start of initial use |
| | 3 | 1 | 1 | 1 | 1.0 | 120 | At time of start of initial use |
| | 4 | 1 | 1 | 1 | 1.0 | 120 | At time of start of initial use |
| Reference Example | 1 | 1 | 14 | 1 | 1.0 | 120 | At time of start of initial use |
| | 2 | 1 | 14 | 1 | 1.0 | 120 | At time of start of initial use |
| | 3 | 1 | 14 | 1 | 1.0 | 120 | At time of start of initial use |
| | 4 | 1 | 1 | 6 | 1.0 | 120 | At time of start of initial use |

TABLE 3-4

Evaluation conditions and evaluation results

| | | Condition | Time difference (second) between first and second wiping steps | Third wiping step | Warming of recording head | Ejection misdirection at time of start of initial use | Ejection misdirection after long-term use |
|---|---|---|---|---|---|---|---|
| | | First cleaning sequence | | Second cleaning sequence | | Evaluation results Ejection | |
| Example | 25 | 1 | 10 | Edge portion | YES | AA | A |
| | 26 | 1 | 10 | Edge portion | YES | AA | A |
| | 27 | 1 | 10 | Edge portion | YES | A | A |
| | 28 | 1 | 10 | Edge portion | YES | A | A |

TABLE 3-4-continued

| | | First cleaning sequence | | | Evaluation results | |
| | | Time difference | Second cleaning sequence | | Ejection | |
| | Condition | (second) between first and second wiping steps | Third wiping step | Warming of recording head | misdirection at time of start of initial use | Ejection misdirection after long-term use |
|---|---|---|---|---|---|---|
| 29 | 1 | 10 | Edge portion | YES | A | A |
| 30 | 1 | 10 | Edge portion | YES | A | A |
| 31 | 1 | 10 | Edge portion | YES | B | A |
| 32 | 1 | 10 | Edge portion | YES | B | A |
| 33 | 1 | 10 | Edge portion | YES | A | A |
| 34 | 1 | 10 | Edge portion | YES | A | A |
| 35 | 1 | 10 | Edge portion | YES | A | A |
| 36 | 1 | 10 | Edge portion | YES | A | A |
| 37 | 1 | 10 | Edge portion | YES | AA | A |
| 38 | 1 | 10 | Edge portion | YES | AA | A |
| 39 | 1 | 10 | Edge portion | YES | A | A |
| 40 | 1 | 10 | Edge portion | YES | AA | A |
| 41 | 2 | 3 | Body portion | NO | B | B |
| Comparative Example 1 | 1 | 10 | Edge portion | YES | C | A |
| 2 | 6 | — | Edge portion | YES | C | A |
| 3 | 7 | — | Edge portion | YES | C | A |
| 4 | 8 | 0.03 | Edge portion | YES | C | A |
| Reference Example 1 | 1 | 10 | Edge portion | YES | AA | A |
| 2 | 6 | — | Edge portion | YES | AA | A |
| 3 | 7 | — | Edge portion | YES | AA | A |
| 4 | 1 | 10 | Edge portion | YES | A | A |

The "ejection misdirection at time of start of initial use" of Examples 36 and 39 had A rank, but the ejection misdirection was relatively suppressed as compared to that of other Examples having A rank.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-128304, filed Aug. 7, 2023, and Japanese Patent Application No. 2024-122048, filed Jul. 29, 2024, which are hereby incorporated by reference herein in their entirety.

What is claimed is:

1. An ink jet recording method using an ink jet recording apparatus, the ink jet recording apparatus comprising:
    an aqueous ink comprising a pigment and a resin;
    an ink storage portion configured to store the aqueous ink;
    a recording head comprising an ejection orifice surface having formed therein an ejection orifice configured to eject the aqueous ink supplied from the ink storage portion, the recording head being incorporated into the ink storage portion; and
    a wiping unit configured to wipe the ejection orifice surface,
    the ejection orifice surface being subjected to water-repellent treatment,
    the ink jet recording method comprising recording an image by applying the aqueous ink ejected from the ejection orifice to a recording medium,
    wherein the ejection orifice surface of the recording head has a protective tape bonded thereto, the protective tape comprising an adhesion layer formed from an adhesive, the protective tape being peeled at the time of use,
    wherein the ink jet recording method further comprises a first cleaning sequence of wiping the ejection orifice surface through use of one wiper having a blade shape, the first cleaning sequence comprising a first wiping step and a second wiping step that are carried out successively to each other,
    wherein the first wiping step comprises wiping the ejection orifice surface with a body portion of the one wiper with the one wiper being bent, and
    wherein the second wiping step comprises wiping the ejection orifice surface with an edge portion of the one wiper.

2. The ink jet recording method according to claim 1, wherein the first cleaning sequence is executed immediately after the protective tape is peeled.

3. The ink jet recording method according to claim 1, wherein the first wiping step is carried out only in the first cleaning sequence.

4. The ink jet recording method according to claim 1, further comprising a second cleaning sequence to be executed after the first cleaning sequence,
    wherein the second cleaning sequence comprises a third wiping step of wiping the ejection orifice surface with the edge portion of the wiper while warming the recording head.

5. The ink jet recording method according to claim 1, wherein an interval from an end of the first wiping step to a start of the second wiping step is 5 seconds or more to 15 seconds or less.

6. The ink jet recording method according to claim 1, wherein the one wiper has a thickness of 0.5 mm or more to 1.5 mm or less.

7. The ink jet recording method according to claim 1, wherein each of the first wiping step and the second wiping step is carried out two times or more.

8. The ink jet recording method according to claim 1, wherein a speed of wiping the ejection orifice surface through use of the one wiper is 100 mm/s or more to 150 mm/s or less.

9. The ink jet recording method according to claim 1, wherein an entrance amount of the one wiper in the first wiping step is 1.0 mm or more to 1.8 mm or less, and an entrance amount of the one wiper in the second wiping step is 0.3 mm or more to 1.0 mm or less.

10. The ink jet recording method according to claim 1, wherein the pigment comprises carbon black.

11. The ink jet recording method according to claim 1, wherein a content (% by mass) of the pigment in the aqueous ink is 0.50% by mass or more to 10.00% by mass or less with respect to a total mass of the ink.

12. The ink jet recording method according to claim 11, wherein the aqueous ink has a pH at 25° C. of 8.9 or more to 9.3 or less.

13. The ink jet recording method according to claim 1, wherein a content (% by mass) of the resin in the aqueous ink is 0.10% by mass or more to 20.00% by mass or less with respect to a total mass of the ink.

14. The ink jet recording method according to claim 1, wherein the adhesive is one of a silicone-based adhesive or an acrylic adhesive.

15. The ink jet recording method according to claim 1, wherein the adhesive is an acrylic adhesive.

16. The ink jet recording method according to claim 15, wherein the acrylic adhesive comprises a metal chelate-based crosslinking agent, and wherein the aqueous ink has a pH at 25° C. of 8.6 or more.

17. The ink jet recording method according to claim 1, wherein the ink storage portion is replaced with another ink storage portion after the aqueous ink stored therein has been consumed.

18. The ink jet recording method according to claim 1, wherein the ink jet recording apparatus further comprises:

a second ink storage portion having a capacity larger than a capacity of the ink storage portion; and a tube through which the aqueous ink flows between the second ink storage portion and the ink storage portion.

19. An ink jet recording apparatus to be used in an ink jet recording method using the ink jet recording apparatus, the ink jet recording apparatus comprising:

an aqueous ink comprising a pigment and a resin;

an ink storage portion configured to store the aqueous ink;

a recording head comprising an ejection orifice surface having formed therein an ejection orifice configured to eject the aqueous ink supplied from the ink storage portion, the recording head being incorporated into the ink storage portion; and a wiping unit configured to wipe the ejection orifice surface, the ejection orifice surface being subjected to water-repellent treatment, the ink jet recording method comprising recording an image by applying the aqueous ink ejected from the ejection orifice to a recording medium, wherein the ejection orifice surface of the recording head has a protective tape bonded thereto, the protective tape comprising an adhesion layer formed from an adhesive, the protective tape being peeled at the time of use, wherein the ink jet recording method further comprises a first cleaning sequence of wiping the ejection orifice surface through use of one wiper having a blade shape, the first cleaning sequence comprising a first wiping step and a second wiping step that are carried out successively to each other, wherein the first wiping step comprises wiping the ejection orifice surface with a body portion of the one wiper with the one wiper being bent, and wherein the second wiping step comprises wiping the ejection orifice surface with an edge portion of the one wiper.

* * * * *